Aug. 11, 1942.  F. T. DIXON  2,292,870
CRANE FOR SALVAGE TRUCKS
Filed Oct. 6, 1941  4 Sheets-Sheet 1

Inventor
Frank Thomas Dixon
By *Clarence A. O'Brien*
Attorney

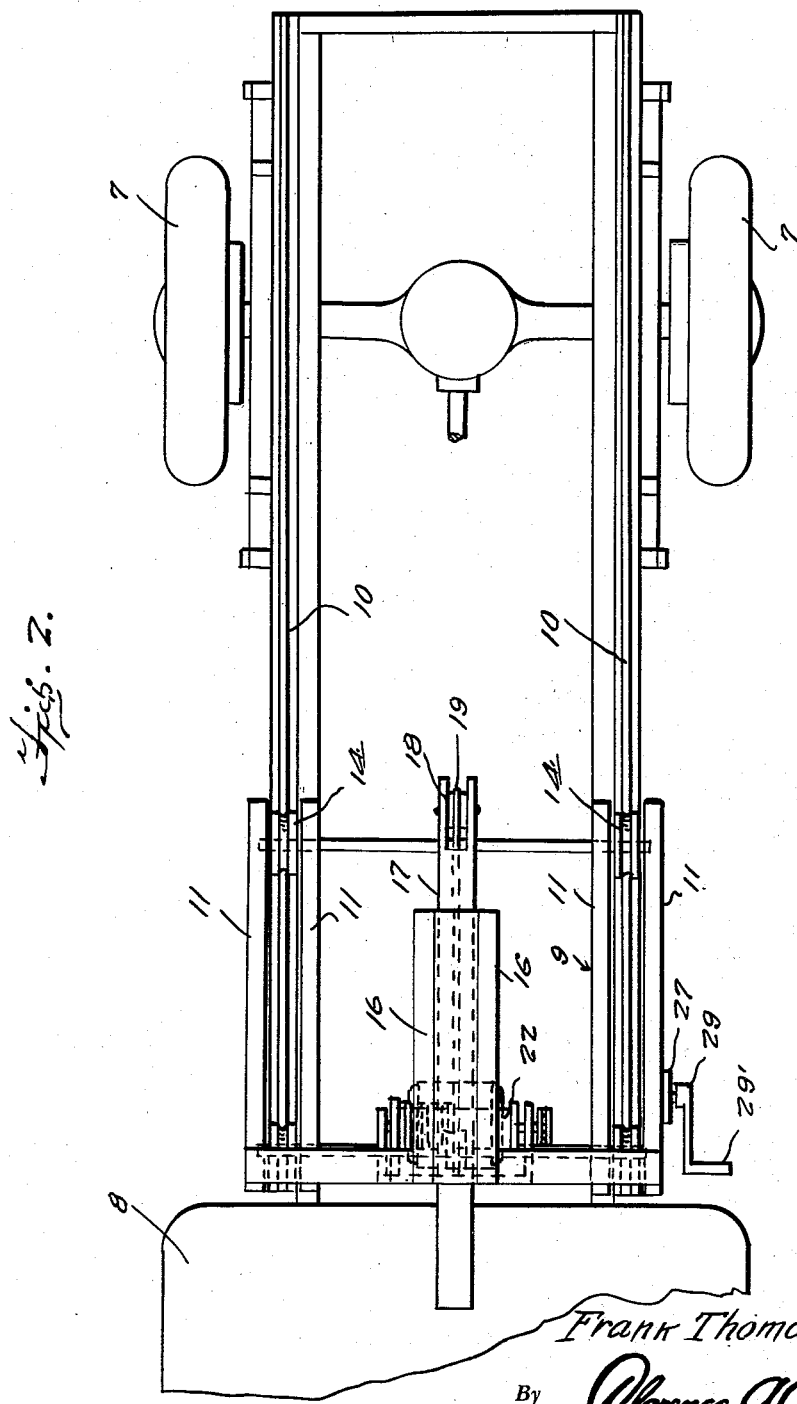

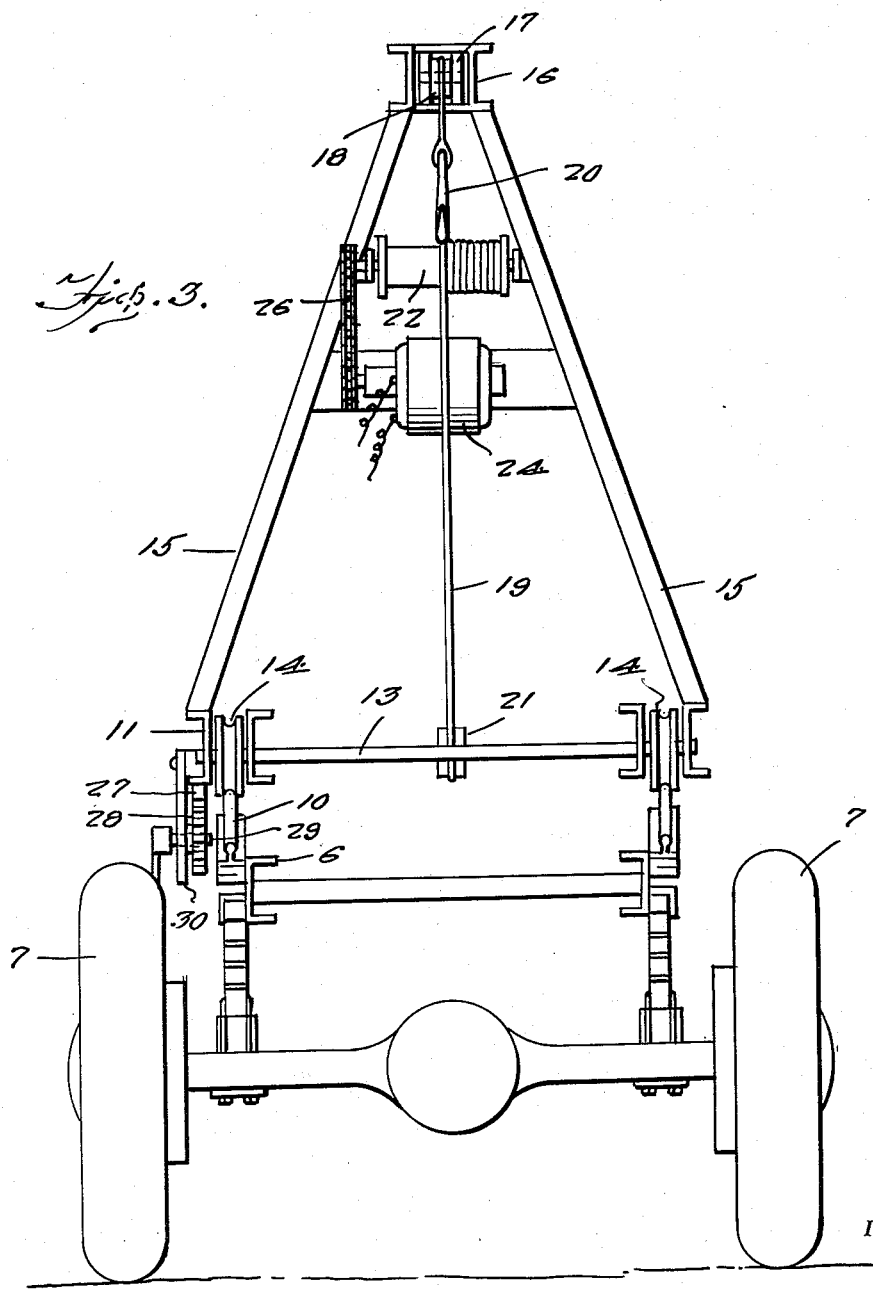

Aug. 11, 1942.   F. T. DIXON   2,292,870
CRANE FOR SALVAGE TRUCKS
Filed Oct. 6, 1941   4 Sheets-Sheet 4
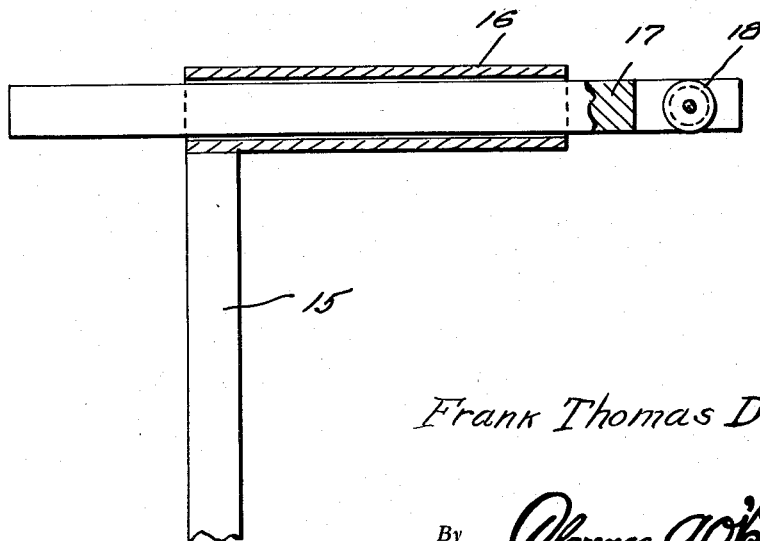
Inventor
Frank Thomas Dixon
By Clarence A. O'Brien
Attorney Patented Aug. 11, 1942

2,292,870

UNITED STATES PATENT OFFICE 2,292,870

CRANE FOR SALVAGE TRUCKS

Frank Thomas Dixon, Altoona, Pa., assignor to Dixon Truck Parts Company, Altoona, Pa., a corporation of Pennsylvania Application October 6, 1941, Serial No. 413,897

1 Claim. (Cl. 214—65)

This invention relates to new and useful improvements in salvage machinery, and more particularly to a lift and towing crane for salvage trucks.

The principal object of the present invention is to provide a crane which is shiftably mounted on a truck in such a manner that it can be run rearwardly on the truck to immediately lift a trailer or other vehicle and then run forwardly in order to pull the forward portion of the trailer or other vehicle onto the truck and in a suitably supported position to be towed.

Other objects and advantages of the invention will become apparent to the reader of the following specification.

In the drawings:

Figure 2 is a top plan view of the structure shown in Figure 1.

Figure 3 is a rear elevational view.

Figure 4 is a fragmentary side elevational view showing the crane in rearward position and in lifting engagement with the forward end of the trailer.

Figure 5 is a fragmentary detailed sectional view showing the slidable beam.

Figure 1:
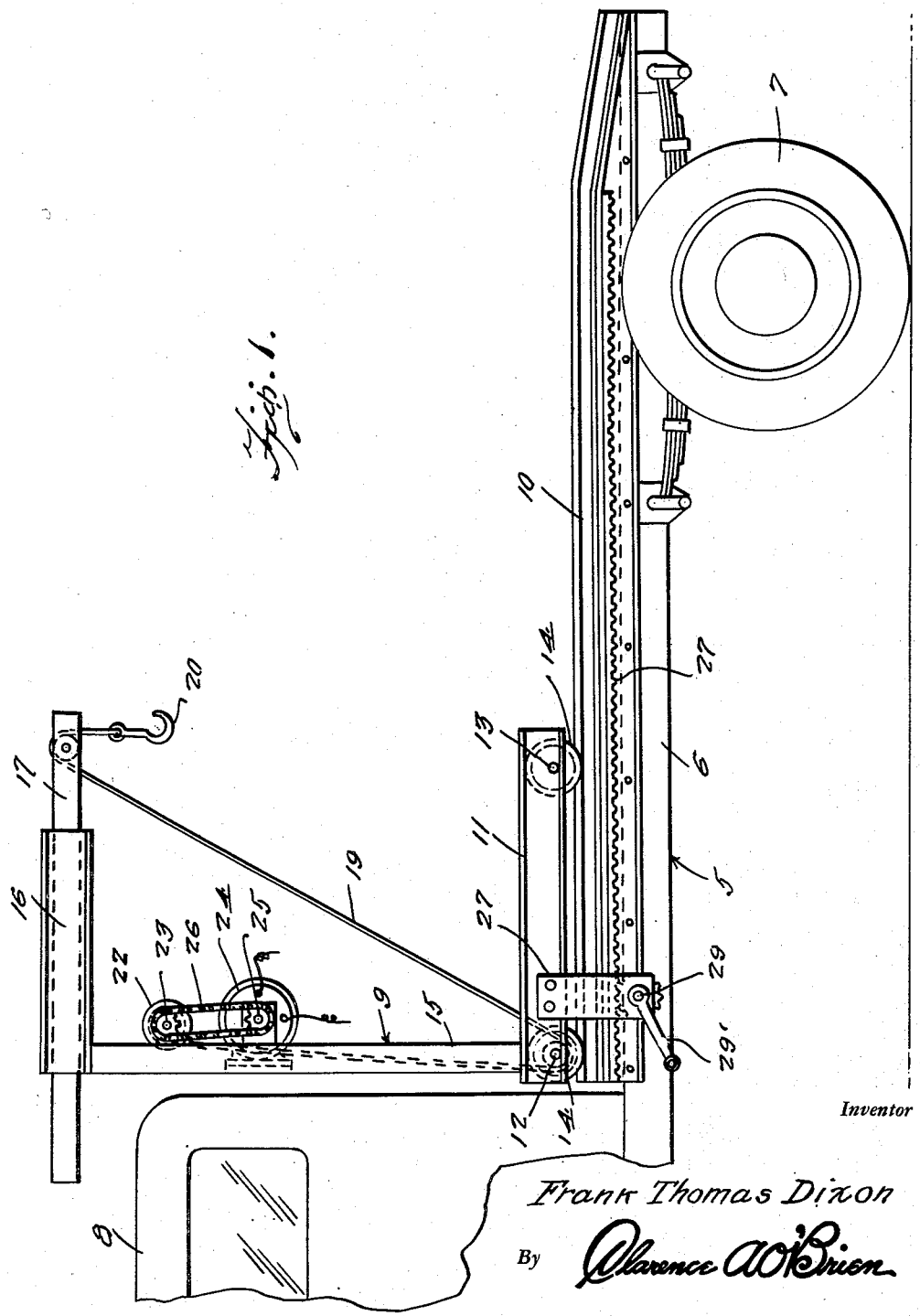
Figure 1 represents a fragmentary side elevational view showing the crane in forward position.

Referring to the drawings wherein like numerals designate like parts, it can be seen that numeral 5 generally refers to a salvage truck which has a chassis frame 6, wheels 7 and a driver's cab 8.

Numeral 9 generally refers to a crane which is the important part of the present invention, and this crane operates on rails 10 supported by the chassis frame 6. As can be seen in Figure 1, the rear ends of the rails 10 slope so as to facilitate the pulling onto the truck of a trailer or other vehicle required to be towed.

The crane 9 is made up of two pairs of closely spaced channel members 11, 11 and 11, 11. Forward and rearward shafts 12, 13 are disposed through these channeled members 11 and each has wheels 14 thereon grooved to receive the tread portions of the rails 10.

Upwardly converging channeled posts 15, 15 rise from the forward ends of the channeled members and support a pair of channeled bars 16, 16 which together define a slideway for accommodating a beam 17 in which a pulley 18 is mounted.

Over this pulley 18 is trained a cable 19 having a hook 20 at its load engaging end. This cable 19 extends downwardly and under the pulley 21 located on the shaft 12 and then upwardly to a drum 22 suitably mounted between the upper portions of the posts 15, 15. One end of this drum is provided with a sprocket wheel 23. Also suitably mounted on the upper portions of the posts 15 is an electric motor 24, driving a sprocket wheel 25, and a chain 26 is trained over these sprockets 23 and 25. Thus, the drum 22 is driven by the motor 24 and can be controlled by a suitable rheostat, not shown.

On the under side of one of the channeled members 11 is an elongated rack 27 with which engages a gear 28. This gear is on a short shaft 29 journaled through an apron 30 which depends from the same channeled member 11. Obviously, by rotating the gear 28, the crane 9 can be fed in the desired direction.

As can be seen in Figure 4, the hook 20 can be engaged with a chain 31 and the latter disposed around the usual coupling pin 32 of a trailer 33 or other vehicle, after the crane 9 has been moved to the rear end portion of the truck. After the trailer has been lifted, the crane 9 can be moved forwardly, carrying the forward portion of the trailer onto the rear end portion of the truck. Later the crane can be moved entirely forward and the trailer pulled as much as desired up onto the truck.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In combination with a truck having side chassis bars, a pair of track rails fixed to said bars to extend along the same, respectively, a carriage including pairs of outer and inner laterally spaced channel beams, said beams extending longitudinally above said rails, front and rear pairs of track wheels running between the beams of said pairs upon said rails, a pair of upwardly converging supports arising from the outer bars of said pairs, respectively, at one end thereof, guideway forming members at the upper ends of said supports, an arm mounted in said guideways for endwise adjustment therein in the line of travel of the carriage, a sheave at one end of said arm, a second sheave mounted on said carriage intermediate said pairs of beams, a motor operated reel mounted on said supports above said second sheave, and a hoisting cable trained over the first-mentioned sheave and under the second-mentioned sheave and having its end connected to said reel.

FRANK THOMAS DIXON.